Patented Feb. 13, 1940

2,189,806

UNITED STATES PATENT OFFICE 2,189,806

AZO DYES

Joseph W. Lang, Woodstown, N. J., and Crayton K. Black, Wilmington, Del., assignors to E. I. du Pont de Nemours & Company, Wilmington, Del., a corporation of Delaware No Drawing. Application August 5, 1937,
Serial No. 157,542

9 Claims. (Cl. 260—202)

This invention relates to dyes, pigments, and lakes made from 2-chlor-4-amino-toluene-5-sulfonic acid and beta-hydroxy-naphthoic acid.

A pigment or a lake made from 2-chlor-4-amino-toluene-5-sulfonic acid diazotized and coupled to beta-hydroxy-naphthoic acid and laked is known and has good properties, but it lacks certain tinctorial and fastness effects.

It is an object of this invention to produce colors of the type described which have improved tinctorial properties and improved fastness to light and other constructive influences which affect this and similar pigments.

The objects of the invention are accomplished, generally speaking, by coupling beta-hydroxy-naphthoic acid with a mixture of diazotized 2-chlor-4-amino-toluene-5-sulfonic acid and a diazotizable primary aromatic amine, represented by the formula:

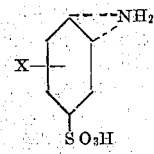

in which X represents at least one hydrogen or an auxochrome substituent therefor such as alkyl, alkoxy, halogen, nitro, amino, and carboxylic and sulfonic acids, which is added to the main intermediate in predetermined quantities. It is our surprising discovery that this addition produces a pigment of greater depth, more covering power, darker mass tone, and of qualities equal in all other essential respects to the products of the prior art.

The following examples illustrate but do not limit the invention. In these examples the parts are by weight.

Example I 10 parts of 2-chlor-4-amino-toluene-5-sulfonic acid and 1.1 parts of 6-chlor-2-amino-toluene-4-sulfonic acid were dissolved in 100 parts hot water by the addition of 2.15 parts sodium hydroxide. The solution was acidified with 5 parts 100% hydrochloric acid and iced to 0° C. Diazotization was effected by the addition of 3.5 parts of sodium nitrite.

10 parts of 2:3-oxy-naphthoic acid were dissolved in 100 parts of hot water by the addition of 3 parts of sodium hydroxide. 7.5 parts of sodium carbonate were added and the mixture cooled to 18° C. Coupling was effected in the usual manner by adding the diazo component to the 2:3-oxy-naphthoic acid. The dye precipitated out as formed and was finished by heating to 65° C. and filtering.

The isolated soda salt was reslurried to 2300 parts of water at the boil. 25 parts of calcium chloride in 250 parts water were added during 5 minutes. Boiling was continued for 10 minutes after which the pigment was filtered, washed, and dried.

The resulting pigment is very dark, and bright in mass-tone, and yellow and strong in shade in comparison with a color made from 100% 2-chlor-4-amino-toluene-5-sulfonic acid but otherwise identical.

Example II

Using the same procedure as for Example I, substitute 10.4 parts of 2-chlor-4-amino-toluene-5-sulfonic acid and add 0.7 part of 6-chlor-2-amino-toluene-5-sulfonic acid instead of 1.1 parts of 6-chlor-2-amino-toluene-4-sulfonic acid for the diazotization. The resulting pigment is very dark and bright in top tone, and strong and blue in shade when compared with the pigment made from pure 2-chlor-4-amino-toluene-5-sulfonic acid.

Example III

In diazotizing according to the procedure of Example I use 10.4 parts of 2-chlor-4-amino-toluene-5-sulfonic acid and 0.6 part of 4-amino-toluene-2-sulfonic acid. Complete the coupling and laking as in Example I. The resulting pigment is characterized by a very dark, bright mass tone increased strength and blueness of shade, when compared with the pigment made in the same manner with 2-chlor-4-amino-toluene-5-sulfonic acid.

The new colors have a deep and bright mass tone; they are strong, fast to light, and have exceptional pigmenting properties in general. They have excellent working properties in printing inks, paints and rubber in particular, and in general in other places where pigments are useful.

As many apparently widely different embodiments of this invention may be made without departing from the spirit and scope thereof, it is to be understood that we do not limit ourselves to the specific embodiments thereof except as defined in the appended claims.

We claim:

1. A composition of matter containing the members:

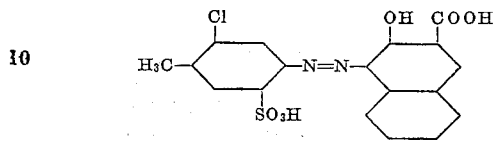

and

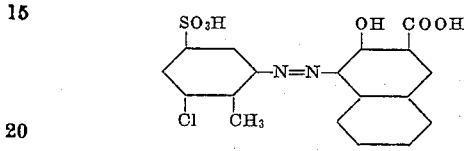

in predetermined quantities and so related as to be incapable of mechanical separation.

2. A composition of matter containing the members:

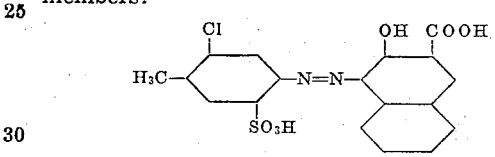

and

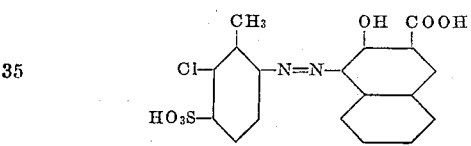

in predetermined quantities and so related as to be incapable of mechanical separation.

3. A composition of matter containing the members:

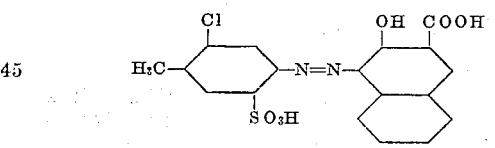

and

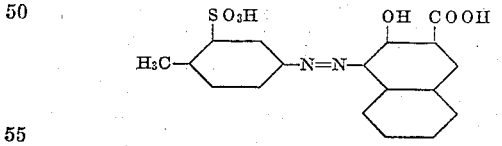

in predetermined quantities and so related as to be incapable of mechanical separation.

4. The process which comprises coupling about 10 parts of 2:3-hydroxy-naphthoic acid simultaneously to about 10.4 parts diazotized 2-chlor-4-amino-toluene-5-sulfonic acid and about .6 part diazotized 4-amino-toluene-2-sulfonic acid, and laking the product with a calcium salt.

5. The process which comprises reacting about 10.4 parts of diazotized 2-chlor-4-amino-toluene-5-sulfonic acid and about .7 part diazotized 6-chlor-2-amino-toluene-5-sulfonic acid with about 10 parts of 2:3-hydroxy-naphthoic acid, and laking the product with a calcium salt.

6. The process which comprises coupling about 10 parts diazotized 2-chlor-4-amino-toluene-5-sulfonic acid and about 1.1 parts diazotized 6-chlor-2-amino-toluene-4-sulfonic acid to about 10 parts 2:3-hydroxy-naphthoic acid, and laking the product with a calcium salt.

7. A composition of matter containing members:

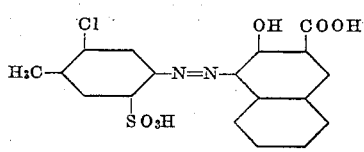

and

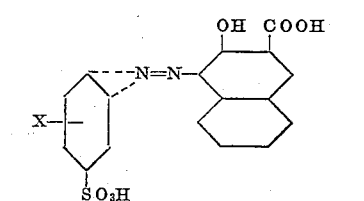

in which X is at least one of a group consisting of hydrogen, alkyl, alkoxy, halogen, nitro, amino, and carboxylic and sulfonic acids, in predetermined quantities and so related as to be incapable of mechanical separation.

8. The process which comprises reacting a mixture of diazotized 2-chlor-4-amino-toluene-5-sulfonic acid and a predetermined quantity of a diazotized amine having the formula:

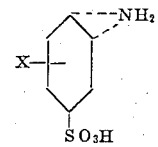

in which X is at least one of a group consisting of hydrogen, alkyl, alkoxy, halogen, nitro, amino, and carboxylic and sulfonic acid, with 2:3-hydroxy-naphthoic acid, and laking the product with an alkaline earth metal salt.

9. The process which comprises reacting a mixture of diazotized 2-chlor-4-amino-toluene-5-sulfonic acid and a predetermined quantity of a diazotized amine having the formula:

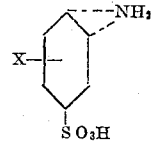

in which X is at least one of a group consisting of hydrogen, alkyl, alkoxy, halogen, nitro, amino, and carboxylic and sulfonic acids, with 2:3-hydroxy-naphthoic acid.

JOSEPH W. LANG.
CRAYTON K. BLACK.

CERTIFICATE OF CORRECTION.

Patent No. 2,189,806.   February 13, 1940.

JOSEPH W. LANG, ET AL.

It is hereby certified that error appears in the printed specification of the above numbered patent requiring correction as follows: Page 1, second column, line 8, Example 1, for "to 2300" read in 2300; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.